(12) United States Patent
Nakamura

(10) Patent No.: US 6,622,478 B2
(45) Date of Patent: Sep. 23, 2003

(54) ENGINE EXHAUST PURIFICATION DEVICE

(75) Inventor: Takeshi Nakamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/937,298
(22) PCT Filed: Feb. 16, 2001
(86) PCT No.: PCT/JP01/01108
§ 371 (c)(1), (2), (4) Date: Sep. 25, 2001
(87) PCT Pub. No.: WO01/61174
PCT Pub. Date: Aug. 23, 2001

(65) Prior Publication Data
US 2002/0152743 A1 Oct. 24, 2002

(30) Foreign Application Priority Data
Feb. 16, 2000 (JP) ......................................... 2000-038688

(51) Int. Cl.[7] ................................................. F01N 3/00
(52) U.S. Cl. ......................................... 60/285; 60/276
(58) Field of Search ......................... 60/274, 276, 277, 60/285; 73/118.1

(56) References Cited

U.S. PATENT DOCUMENTS

| | | | | |
|---|---|---|---|---|
| 5,509,267 A | * | 4/1996 | Theis ........................... | 60/274 |
| 5,609,023 A | | 3/1997 | Katoh et al. ................... | 60/276 |
| 5,842,340 A | | 12/1998 | Bush et al. ..................... | 60/274 |
| 6,116,023 A | * | 9/2000 | Ishizuka et al. ............... | 60/276 |
| 6,119,447 A | * | 9/2000 | Eriksson et al. ............... | 60/285 |
| 6,226,982 B1 | * | 5/2001 | Poggio et al. ................. | 60/285 |
| 6,253,541 B1 | * | 7/2001 | Sullivan et al. ............... | 60/285 |
| 6,256,981 B1 | * | 7/2001 | Sullivan et al. ............... | 60/285 |
| 6,256,983 B1 | * | 7/2001 | Yasui .......................... | 60/285 |
| 6,289,673 B1 | * | 9/2001 | Tayama et al. ................ | 60/274 |

FOREIGN PATENT DOCUMENTS

| | | |
|---|---|---|
| EP | 0 885 657 A2 | 12/1998 |
| EP | 0 926 321 | 6/1999 |
| JP | 9-228873 | 9/1997 |
| WO | 96/41071 | 12/1996 |

* cited by examiner

Primary Examiner—Thomas Denion
Assistant Examiner—Tu M. Nguyen
(74) Attorney, Agent, or Firm—Foley & Lardner

(57) ABSTRACT

A front A/F sensor (4) which detects an air-fuel ratio of exhaust flowing into a first three-way catalyst (3a), a first rear O2 sensor (5a) which detects an oxygen concentration of exhaust flowing out of the first three-way catalyst, a second three-way catalyst (3b) interposed downstream of the first three-way catalyst, and a second rear O2 sensor (5b) which detects an oxygen concentration of the exhaust flowing out of the second three-way catalyst (3b), are provided. During normal running, the oxygen storage amount of the first three-way catalyst (3a) is computed based on the detected air-fuel ratio, and the air-fuel ratio of the engine is controlled based on the computed oxygen storage amount so that the oxygen storage amount of the first three-way catalyst (3a) is a target amount. However, after running at a lean air-fuel ratio due to fuel cut, the air-fuel ratio is controlled based on the oxygen concentration detected by the second rear O2 sensor (5b) so that the oxygen storage amounts of the catalysts are target values.

3 Claims, 18 Drawing Sheets

ENGINE EXHAUST PURIFICATION DEVICE

FIELD OF THE INVENTION

The present invention relates to an engine exhaust purification device provided with a catalyst.

BACKGROUND OF THE INVENTION

JP-A-H9-228873 published by the Japanese Patent Office in 1997 discloses a technique wherein an oxygen amount stored in a three-way catalyst (hereafter, "oxygen storage amount") is estimated based on an engine intake air amount and an air fuel ratio of an exhaust flowing into the catalyst, and engine air-fuel ratio control is performed so that the oxygen storage amount of the catalyst is constant.

To maintain the NOx (nitrogen oxides), CO and HC (hydrocarbon) conversion efficiency of the three-way catalyst at a maximum, the catalyst atmosphere must be maintained at the stoichiometric air-fuel ratio. If the oxygen storage amount of the catalyst is maintained constant, oxygen in the exhaust is stored in the catalyst even if the air-fuel ratio of the exhaust flowing into the catalyst temporarily becomes lean, and conversely, oxygen stored in the catalyst is released even if the air-fuel ratio of the exhaust flowing into the catalyst temporarily becomes rich, so the catalyst atmosphere can be maintained at the stoichiometric air-fuel ratio.

SUMMARY OF THE INVENTION

A structure of a second three-way catalyst is disposed downstream of the above three-way catalyst is proposed to satisfy more stringent exhaust emission performance requirements. In this structure, although oxygen is absorbed by the catalysts up to a maximum limit exceeding a required amount after a lean running such as during fuel cut control, only the oxygen storage amount of the upstream catalyst is controlled so that it returns to the required storage amount in subsequent air-fuel ratio control, whereas the second three-way catalyst is not controlled as it is. The oxygen storage amount of the second three-way catalyst is therefore effectively maintained at its maximum, consequently, the conversion efficiency of the second three-way catalyst cannot be maintained at a maximum, and there is a risk that the NOx discharge amount will increase.

It is therefore an object of this invention to resolve the above problem, and provide an engine exhaust purification device wherein the conversion efficiency of a downstream catalyst is maintained at a high-level after lean running.

In order to achieve above object, this invention provides an exhaust purification device comprising a first catalyst provided in an engine exhaust pipe, a second catalyst provided in downstream of the first catalyst, a front sensor which detects an exhaust characteristic flowing into the first catalyst, a first rear sensor which detects an exhaust characteristic flowing out of the first catalyst, a second rear sensor which detects an exhaust characteristic flowing out of the second catalyst, a microprocessor programmed to compute an oxygen storage amount of the first catalyst using the detected exhaust characteristic, to control an air-fuel ratio of the engine so that the oxygen storage amount of the first catalyst is a target amount based on the computed oxygen storage amount, and to control the air-fuel ratio using an exhaust characteristic detected by the second rear sensor so that the oxygen storage amounts of the first catalyst and the second catalyst are a target amount, after running at a lean air-fuel ratio.

This invention further provides an exhaust purification device comprising a first catalyst provided in an exhaust purification device comprising a first catalyst provided in an engine exhaust pipe, a second catalyst provided in downstream of the first catalyst, a front sensor which detects an exhaust characteristic flowing into the first catalyst, a first rear sensor which detects an exhaust characteristic flowing out of the first catalyst, a second rear sensor which detects an exhaust characteristic flowing out of the second catalyst, and a microprocessor programmed to compute the oxygen storage amount stored in the first catalyst using the exhaust characteristic detected by the front sensor and the exhaust characteristic detected by the first rear sensor during normal running, to compute the oxygen storage amount stored in the first catalyst and second catalyst using the exhaust characteristic detected by the front sensor and the exhaust characteristic detected by the second rear sensor after running at a lean air-fuel ratio, control the engine air-fuel ratio so that, during normal running, the oxygen storage amount of the first catalyst is a target amount based on the computed oxygen storage amount in the first catalyst, and to control the engine air-fuel ratio so that, after running at a lean air-fuel ratio, the oxygen storage amount stored in the first catalyst and the second catalyst is a target amount based on the computed oxygen amount in the first catalyst and the second catalyst.

The details as well as other features and advantages of this invention are set forth in the remainder of the specification and are shown in the accompanying drawings.

Strictly speaking, noble metals adsorb oxygen in the molecular state, and oxygen storage materials absorb oxygen as compounds, but in the following description, adsorption and absorption will be collectively referred to as storage.

Further, the expression "the exhaust air-fuel ratio is rich" means that the oxygen concentration in the exhaust is lower than the oxygen concentration in the exhaust when the engine is running at the stoichiometric air-fuel ratio, and the expression "the exhaust air-fuel ratio is lean" means that the oxygen concentration in the exhaust is higher than the oxygen concentration in the exhaust when the engine is running at the stoichiometric air-fuel ratio. The expression "the exhaust air-fuel ratio is stoichiometric" means that the oxygen concentration of the exhaust is equal to the oxygen concentration in the exhaust when the engine is running at the stoichiometric air-fuel ratio.

DESCRIPTION OF THE PREFERRED EMBODIMENTS

Figure 1:
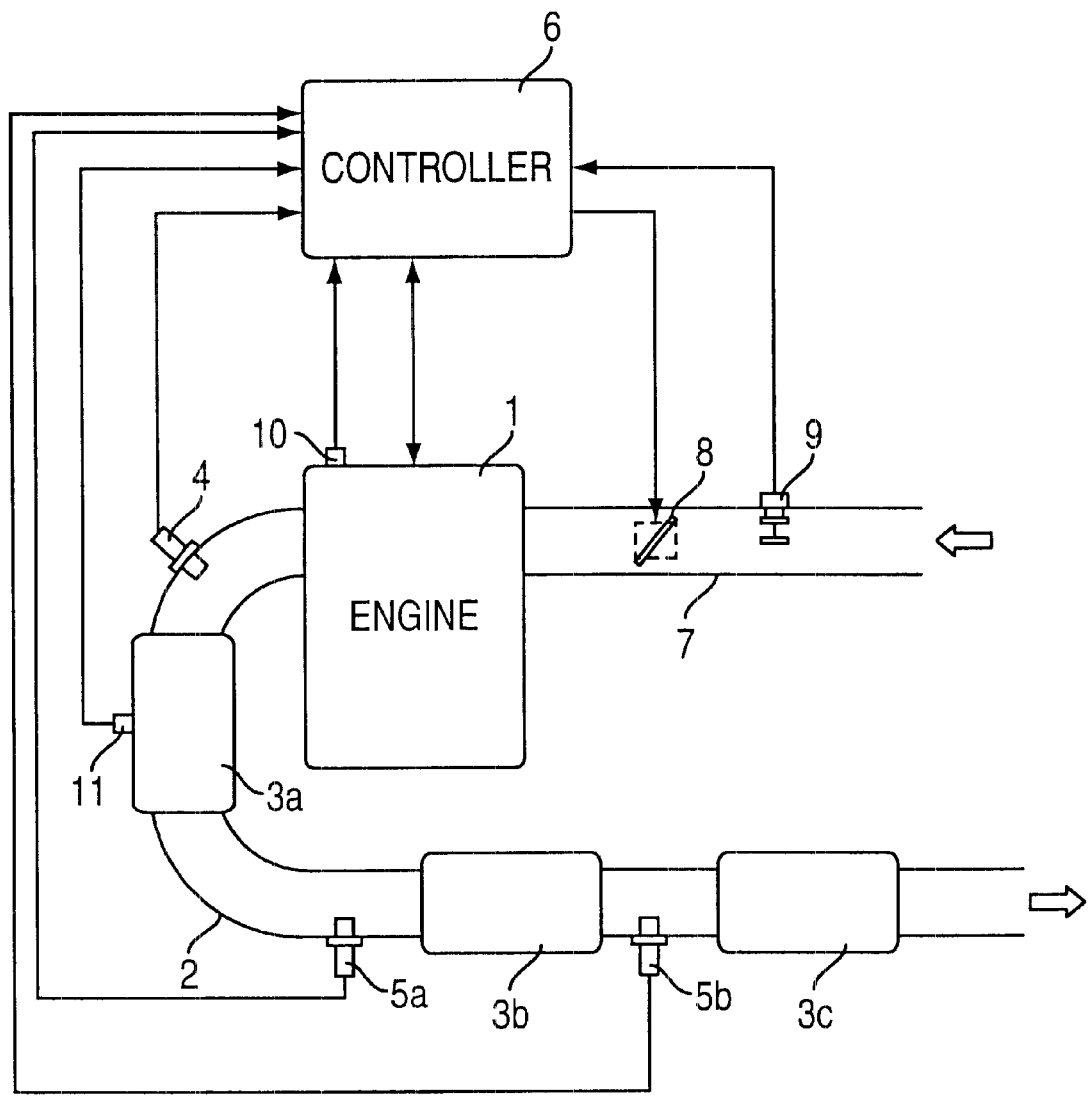
FIG. 1 is a schematic diagram of an exhaust purification device according to this invention.

Referring to FIG. 1 of the drawings, an exhaust passage 2 of an engine 1 is provided with catalysts 3a(first catalyst), 3b(second catalyst), 3c(third catalyst), a front wide range air-fuel ratio sensor 4 (hereafter referred to as front A/F sensor) which is located in an entrance of the catalyst 3a, a first rear oxygen sensor 5a which is located in an exit of the catalyst 3a, a second rear oxygen sensor 5b which is located in an exit of the catalyst 3b and a controller 6.

A throttle 8, and an air flow meter 9 which detects the intake air amount adjusted by the throttle 8, are provided in an intake passage 7 of the engine 1 The catalysts 3a,3b,3c are catalysts having a three-way catalyst function. The catalysts 3a,3b,3c purifies NOx, HC and CO with maximum efficiency when the catalyst atmosphere is at the stoichiometric air-fuel ratio. The catalyst carrier of the catalysts 3a,3b,3c is coated with an oxygen storage material such as cerium oxide, and the catalyst 3 has the function of storing or releasing oxygen according to the air-fuel ratio of the inflowing exhaust (referred to hereafter as oxygen storage function). It is possible to combine catalysts which each catalyst has a different characteristic, for example the first catalyst 3a has the three-way catalyst function, the second catalyst 3b and the third catalyst 3c are HC trap catalyst having the three-way catalyst function.

Here, the oxygen storage amount of the catalysts 3a,3b,3c may be partitioned into a high speed component HO2 which is stored and released by a noble metal in the catalysts 3a,3b,3c (Pt, Rh, Pd), and a low speed component LO2 which is stored and released by the oxygen storage material in the catalysts 3a,3b,3c. The low speed component. LO2 represents the storage and release of a larger amount of oxygen than the high speed component HO2, but its storage/release rate is slower than that of the high speed component HO2.

Further, this high speed component HO2 and low speed component LO2 have characteristics as follows:

When oxygen is stored, oxygen is stored preferentially as the high speed component HO2, and begins to be stored as the low speed component LO2 when the high speed component HO2 has reached a maximum capacity HO2MAX and can no longer be stored.

When oxygen is released, and the ratio of the low speed component LO2 to the high speed component HO2 (LO2/HO2) is less than a predetermined value, i.e. when the high speed component is relatively large, oxygen is preferentially released from the high speed component HO2, and when the ratio of the low speed component LO2 to the high speed component HO2 is larger than the predetermined value, oxygen is released from both the high speed component HO2 and low speed component LO2 so that the ratio of the low speed component LO2 to the high speed component HO2 does not vary.

Figure 2:
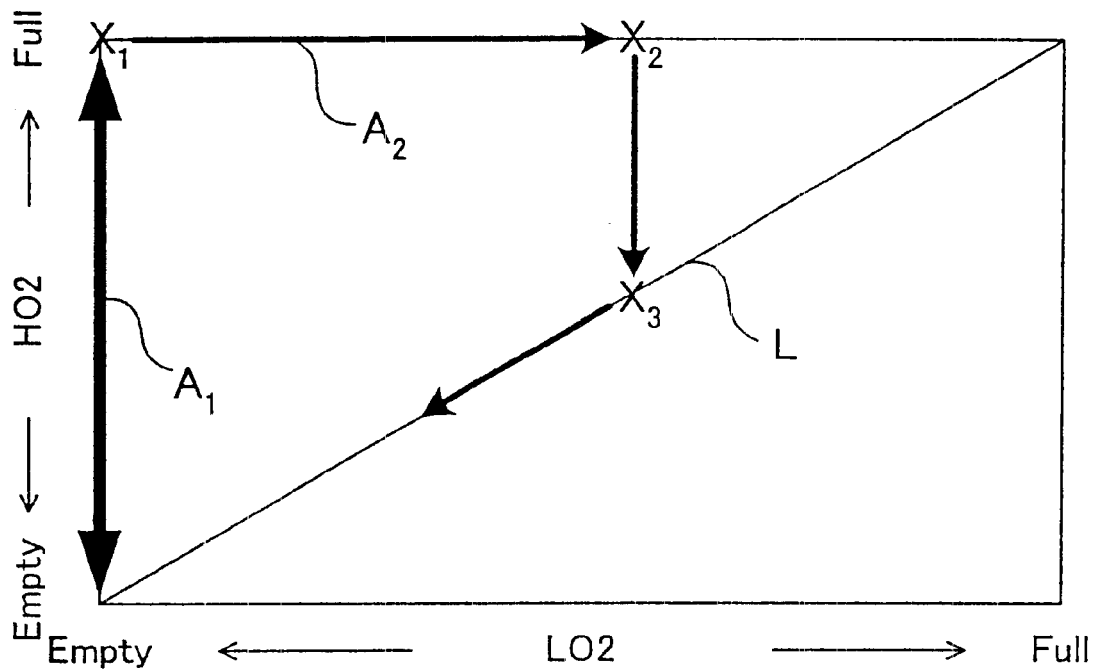
FIG. 2 is a diagram showing the oxygen release characteristics of a catalyst.

FIG. 2 shows the oxygen storage/release characteristics of the catalyst.

The vertical axis shows the high speed component HO2 (oxygen amount stored in the noble metal) and the horizontal axis shows the low speed component LO2 (oxygen amount stored in the oxygen storage material).

In the normal running condition, the low speed component LO2 is almost zero and only the high speed component HO2 varies according to the air-fuel ratio of the exhaust flowing into the catalysts as shown as the arrow A1 in the Figure. The high speed component HO2 is controlled, for example, to be half of its maximum capacity.

However, when the engine fuel cut has performed or when the engine has restarted from the warmed-up state (hot restart), the high speed component HO2 has reached its maximum capacity and oxygen is stored as the low speed component LO2 (arrow A2 in FIG. 2). The oxygen storage amount varies from the point X1 to the point X2.

When oxygen is released from the point X2, oxygen is preferentially released from the high speed component HO2. When the ratio of the low speed component L02 to the high speed component HO2 reaches the predetermined value (X3 in FIG. 2), oxygen is released from both the high speed component HO2 and low speed component LO2 so that the ratio of the low speed component LO2 to the high speed component HO2 does not vary, i.e., oxygen is released while moving on a straight line L shown in the Figure. Here, on the line L, the low speed component is from 5 to 15, but preferably approximately 10, relative to the high speed component.

Returning to FIG. 1, the front A/F sensor 4 provided upstream of the catalyst 3a outputs a voltage according to the air-fuel ratio of the exhaust flowing into the catalyst 3a. the rear oxygen sensors 5a,5b provided downstream of each catalyst 3a,3b detect whether the exhaust air-fuel ratio downstream of the catalyst 3a,3b is rich or lean with the stoichiometric air-fuel ratio as a threshold value. Here, economical oxygen sensors 5a,5b were provided downstream of the catalyst 3a,3b, but an A/F sensor which can detect the air fuel ratio continuously can be provided instead of each sensor.

The cooling water temperature sensor 10 which detects the temperature of the cooling water is fitted to the engine 1. The detected cooling water temperature is used for determining the running state of the engine 1, and also for estimating the catalyst temperature of the catalyst 3a.

The controller 6 comprises a microprocessor, RAM, ROM and I/O interface, and it computes the oxygen storage amount of the catalyst 3a (high speed component HO2 and low speed component LO2) based on the output of the air flow meter 9, front A/F sensor 4 and cooling water temperature sensor 10.

When the high speed component HO2 of the computed oxygen storage amount is greater than a predetermined amount (erg., half the maximum capacity HO2MAX of the high speed component), the controller 6 makes the air fuel ratio of the engine 1 rich, makes the air-fuel ratio of the exhaust flowing into the catalyst 3a rich, and decreases the high speed component HO2. Conversely, when it is less than the predetermined amount, the controller 6 makes the air fuel ratio of the engine 1 lean, makes the air-fuel ratio of the exhaust flowing into the catalyst 3a lean, increases the high speed component HO2, and maintains the high speed component HO2 of the oxygen storage amount constant.

A discrepancy may arise between the computed oxygen storage amount and real oxygen storage amount due to computational error, so the controller 6 resets the computational value of the oxygen storage amount with a predetermined timing based on the air-fuel ratio of the exhaust downstream of the catalyst 3a, and corrects this discrepancy from the real oxygen storage amount.

Specifically, when it is determined that the air-fuel ratio downstream of the catalyst 3a is lean based on the output of the first rear oxygen sensor 5a, it is determined that at least the high speed component HO2 is maximum, and the high speed component HO2 is reset to maximum capacity. When it is determined by the first rear oxygen sensor 5a that the air fuel ratio downstream of the catalyst 3a is rich, oxygen is no longer being released not only from the high speed component HO2 but also from the low speed component LO2, so the high speed component HO2 and high speed component LO2 are reset to minimum capacity.

Next, the control performed by the controller 6 will be described.

First, the computation of the oxygen storage amount will be described, followed by resetting of the computational value of the oxygen storage amount, and air-fuel ratio control of the engine 1 based on the oxygen storage amount.

Figure 3:
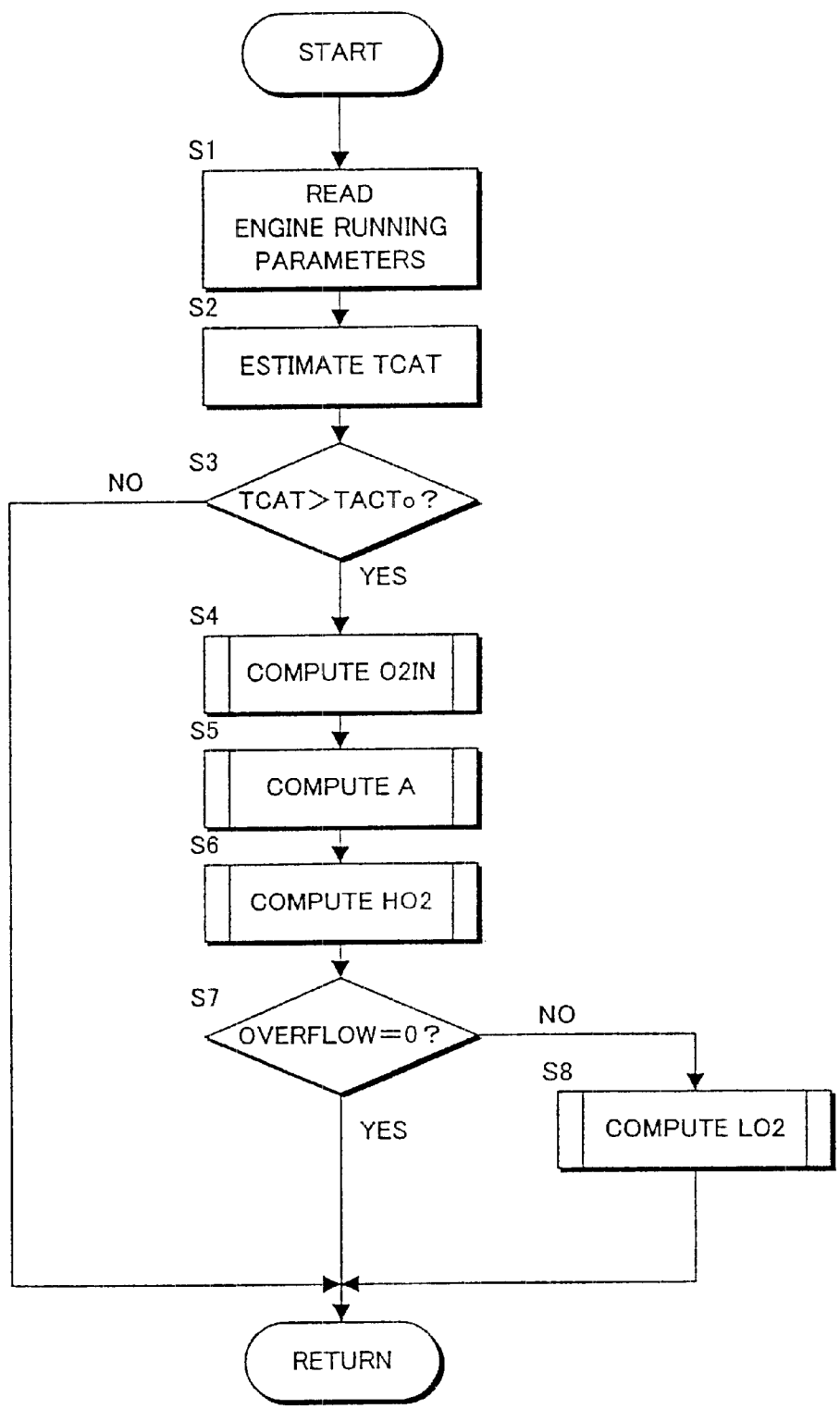
FIG. 3 is a flowchart showing a routine for computing an oxygen storage amount of the catalyst.

The routine for computing the oxygen storage amount of the catalyst 3a is shown in FIG. 3. This routine is performed by the controller 6 at a predetermined interval.

According to this routine, first, in a step S1, the outputs of the cooling water temperature sensor 10 and air flow meter 9 are read as running parameters of the engine 1 In a step S2, a temperature TCAT of the catalyst 3a is estimated based on these parameters. In a step S3, by comparing the estimated catalyst temperature TCAT and a catalyst activation temperature TACTo, (e.g. 300° C.) it is determined whether or not the catalyst 3a has activated.

When it is determined that the catalyst activation temperature TACTo has been reached, the routine proceeds to a step S4 to compute the oxygen storage amount of the catalyst 3a. When it is determined that the catalyst activation temperature TACTo has not been reached, processing is terminated assuming that the catalyst 3a does not store or release oxygen.

In the step S4, a subroutine (FIG. 4) for computing an oxygen excess/deficiency amount O2IN is performed, and the oxygen excess/deficiency amount of the exhaust flowing into the catalyst 3a is computed. In a step S5, a subroutine (FIG. 5) for computing an oxygen release rate A of the high speed component of the oxygen storage amount is performed, and the oxygen release rate A of the high speed component is computed.

Further, in a step S6, a subroutine (FIG. 6) for computing the high speed component HO2 of the oxygen storage amount is performed, and the high speed component HO2 and an oxygen amount OVERFLOW overflowing into the low speed component LO2 without being stored as the high speed component HO2, are computed based on the oxygen excess/deficiency amount O2IN and the oxygen release rate A of the high speed component.

In a step S7, it is determined whether or not all of the oxygen excess/deficiency amount O2IN flowing into the catalyst 3a has been stored as the high speed component HO2 based on the overflow oxygen amount OVERFLOW. When all of the oxygen excess/deficiency amount O2IN has been stored as the high speed component (OVERFLOW=0), processing is terminated. In other cases, the routine proceeds to a step S8, a subroutine (FIG. 7) is performed for computing the low speed component LO2, and the low speed component LO2 is computed based on the overflow oxygen amount OVERFLOW overflowing from the high speed component HO2.

Here, the catalyst temperature TCAT is estimated from the cooling water temperature of the engine 1, the engine load and the engine rotation speed, but a temperature sensor 11 may also be attached to the catalyst 3a as shown in FIG. 1, and the temperature of the catalyst 3a measured directly.

When the catalyst temperature TCAT is less than the activation temperature TACTo, the oxygen storage amount is not computed, but the step S3 may be eliminated, and the effect of the catalyst temperature TCAT may be reflected in the oxygen release rate A of the high speed component or an oxygen storage/release rate B of the low speed component, described later.

Next, a subroutine performed from steps S4 to S6 and in the step S8 will be described.

Figure 4:
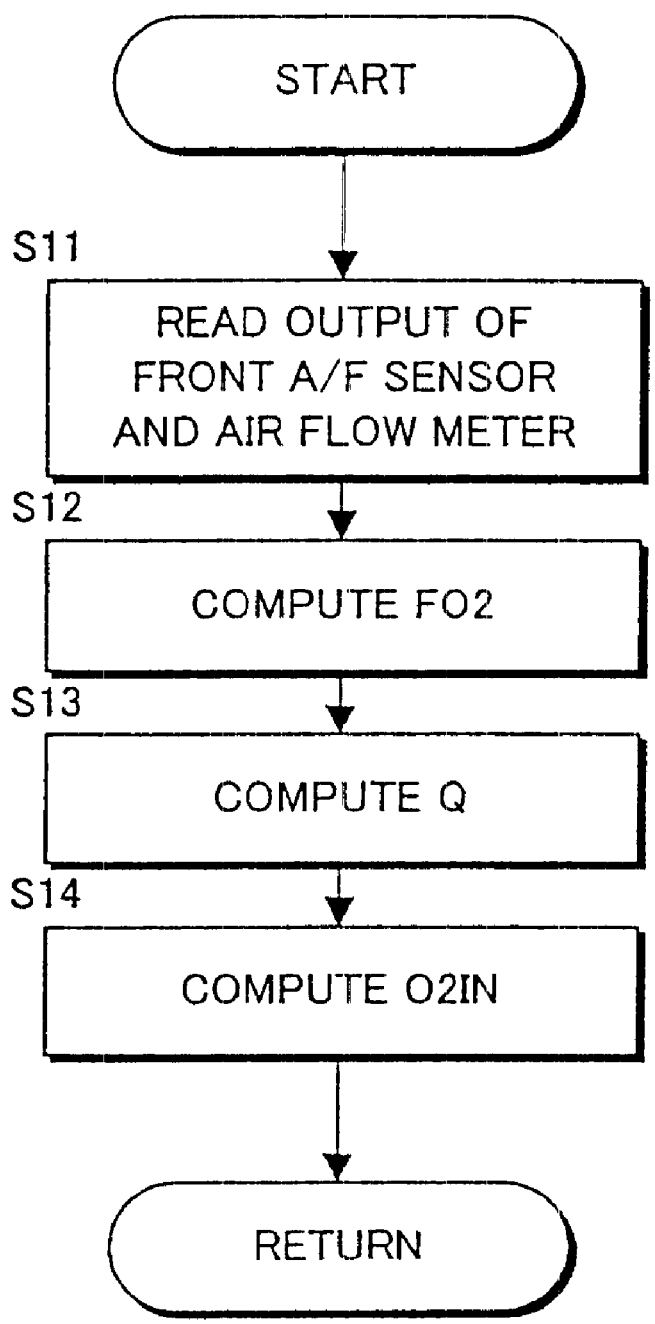
FIG. 4 is a flowchart showing a subroutine for computing an oxygen excess/deficiency amount in exhaust flowing into the catalyst.

FIG. 4 shows the subroutine for computing the oxygen excess/deficiency amount O2IN of the exhaust flowing into the catalyst 3a. In this subroutine, the oxygen excess/deficiency amount O2IN of the exhaust flowing into the catalyst 3a is computed based on the air-fuel ratio of the exhaust upstream of the catalyst 3a and the intake air amount of the engine 1.

First, in a step S11, the output of the front A/F sensor 4 and the output of the air flow meter 9 are read.

Next, in a step S12, the output of the front A/F sensor 4 is converted to an excess/deficiency oxygen concentration FO2 of the exhaust flowing into the catalyst 3a using a predetermined conversion table. Here, the excess/deficiency oxygen concentration FO2 is a relative concentration based on the oxygen concentration at the stoichiometric air-fuel ratio. If the exhaust air-fuel ratio is equal to the stoichiometric air-fuel ratio, it is zero, if it is richer than the stoichiometric air-fuel ratio it is negative, and if it is leaner than the stoichiometric air-fuel ratio, it is positive.

In a step S13, the output of the air flow meter 9 is converted to an intake air amount Q using a predetermined conversion table, and in a step S14, the intake air amount Q is multiplied by the excess/deficiency oxygen concentration FO2 to compute the excess/deficiency oxygen amount O2IN of the exhaust flowing into the catalyst 3a.

As the excess/deficiency oxygen concentration FO2 has the above characteristics, the excess/deficiency oxygen amount O2IN is zero when the exhaust flowing into the catalyst 3a is at the stoichiometric air-fuel ratio, a negative value when it is rich, and a positive value when it is lean.

Figure 5:
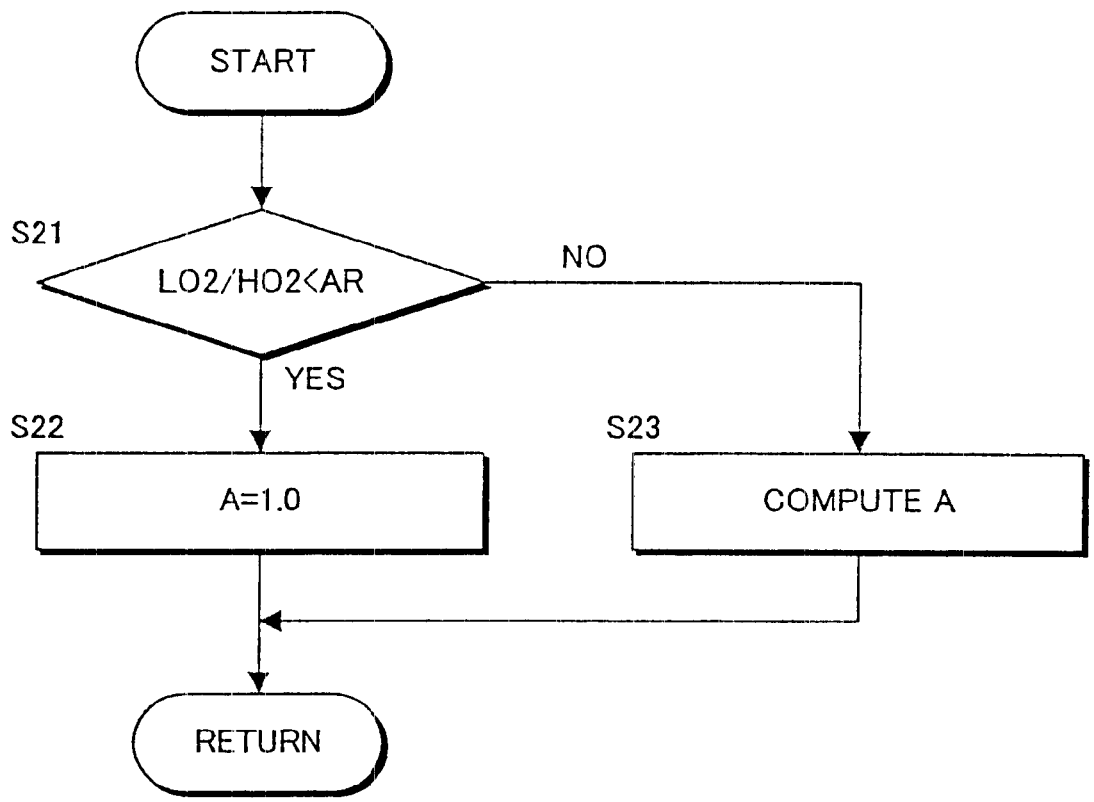
FIG. 5 is a flowchart showing a subroutine for computing an oxygen release rate of a high speed component.

FIG. 5 shows a subroutine for computing the oxygen release rate A of the high speed component of the oxygen storage amount. In this subroutine, as the oxygen release rate of the high speed component HO2 is affected by the low speed component LO2, the oxygen release rate A of the high speed component is computed according to the low speed component LO2.

First, in a step S21, it is determined whether or not a ratio LO2/HO2 of low speed component relative to the high speed component is less than a predetermined value AR (e.g. AR=10). When it is determined that the ratio LO2/HO2 is less than the predetermined value AR, i.e., when the high speed component HO2 is relatively larger than the low speed component LO2, the routine proceeds to a step S22, and the oxygen release rate A of the high speed component is set to 1.0 expressing the fact that oxygen is released first from the high speed component HO2.

On the other hand, when it is determined that the ratio LO2/HO2 is not less than the predetermined value AR, oxygen is released from the high speed component HO2 and the low speed component LO2 so that the ratio of the low speed component LO2 to the high speed component HO2 does not vary. The routine then proceeds to a step S23, and a value of the oxygen release rate A of the high speed component is computed which does not cause the ratio LO2/HO2 to vary.

Figure 6:
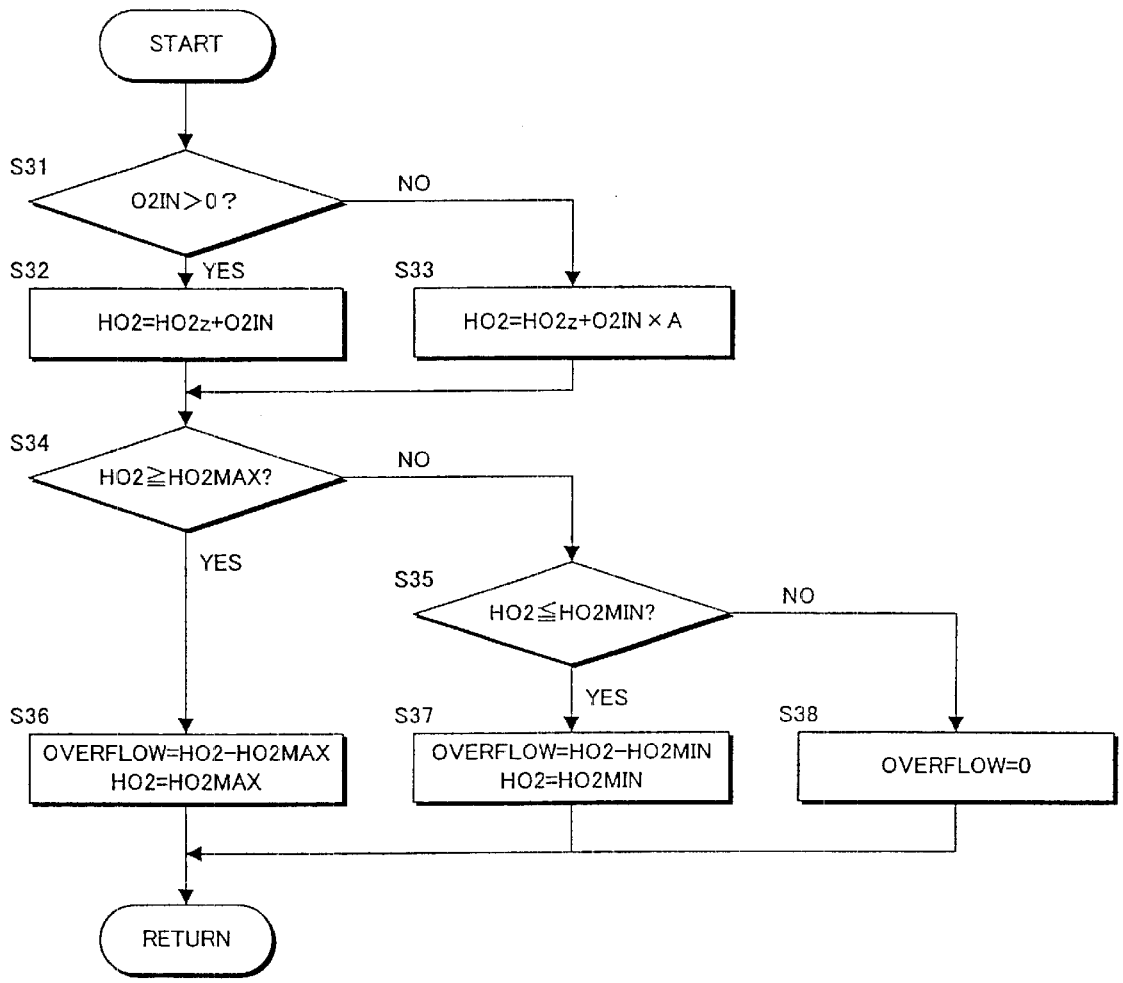
FIG. 6 is a flowchart showing a subroutine for computing the high speed component of the oxygen storage amount.

FIG. 6 shows a subroutine for computing the high speed component HO2 of the oxygen storage amount. In this subroutine, the high speed component HO2 is computed based on the oxygen excess/deficiency amount O2IN of the exhaust flowing into the catalyst 3 and the oxygen release rate A of the high speed component.

First, it is determined in a step S31 whether or not the high speed component HO2 is being stored or released based on the oxygen excess/deficiency amount O2IN.

When the air-fuel ratio of the exhaust flowing into the catalyst 3a is lean and the oxygen excess/deficiency amount O2IN is larger than zero, it is determined that the high speed component HO2 is being stored, the routine proceeds to a step S32, and the high speed component HO2 is computed from the following equation (1):

$$HO2=HO2z+O2IN \qquad (1)$$

where: HO2z=value of high speed component HO2 on immediately preceding occasion.

On the other hand, when it is determined that the oxygen excess/deficiency amount O2IN is less than zero and the high speed component is being released, the routine proceeds to a step S33, and the high speed component HO2 is computed from the following equation (2):

$$HO2=HO2z+O2IN \times A \qquad (2)$$

where: A=oxygen release rate of high speed component HO2.

In steps S34, S35, it is determined whether or not the computed HO2 exceeds the maximum capacity HO2MAX of the high speed component, or whether it is not less than a minimum capacity HO2MIN (=0).

When the high speed component HO2 is greater than the maximum capacity HO2MAX, the routine proceeds to a step S36, the overflow oxygen amount (excess amount) OVERFLOW flowing out without being stored as the high speed component HO2 is computed from the following equation (3):

$$OVERFLOW=HO2-HO2MAX \qquad (3),$$

and the high speed component HO2 is limited to the maximum capacity HO2MAX.

When the high speed component HO2 is less than the minimum capacity HO2MIN, the routine proceeds to a step S37, the overflow oxygen amount (deficiency amount) OVERFLOW which was not stored as the high speed component HO2 is computed by the following equation (4):

$$OVERFLOW=HO2-HO2MIN \qquad (4),$$

and the high speed component HO2 is limited to the minimum capacity HO2MIN. Here, zero is given as the minimum capacity HO2MIN, so the oxygen amount which is deficient when all the high speed component HO2 has been released is computed as a negative overflow oxygen amount.

When the high speed component HO2 lies between the maximum capacity HO2MAX and minimum capacity HO2MIN, the oxygen excess/deficiency amount O2IN of the exhaust flowing into the catalyst 3a is all stored as the high speed component HO2, and zero is set to the overflow oxygen amount OVERFLOW.

Here, when the high speed component HO2 is greater than the maximum capacity HO2MAX or less than the minimum capacity HO2MIN, the overflow oxygen amount OVERFLOW which has overflowed from the high speed component HO2 is stored as the low speed component LO2.

Figure 7:
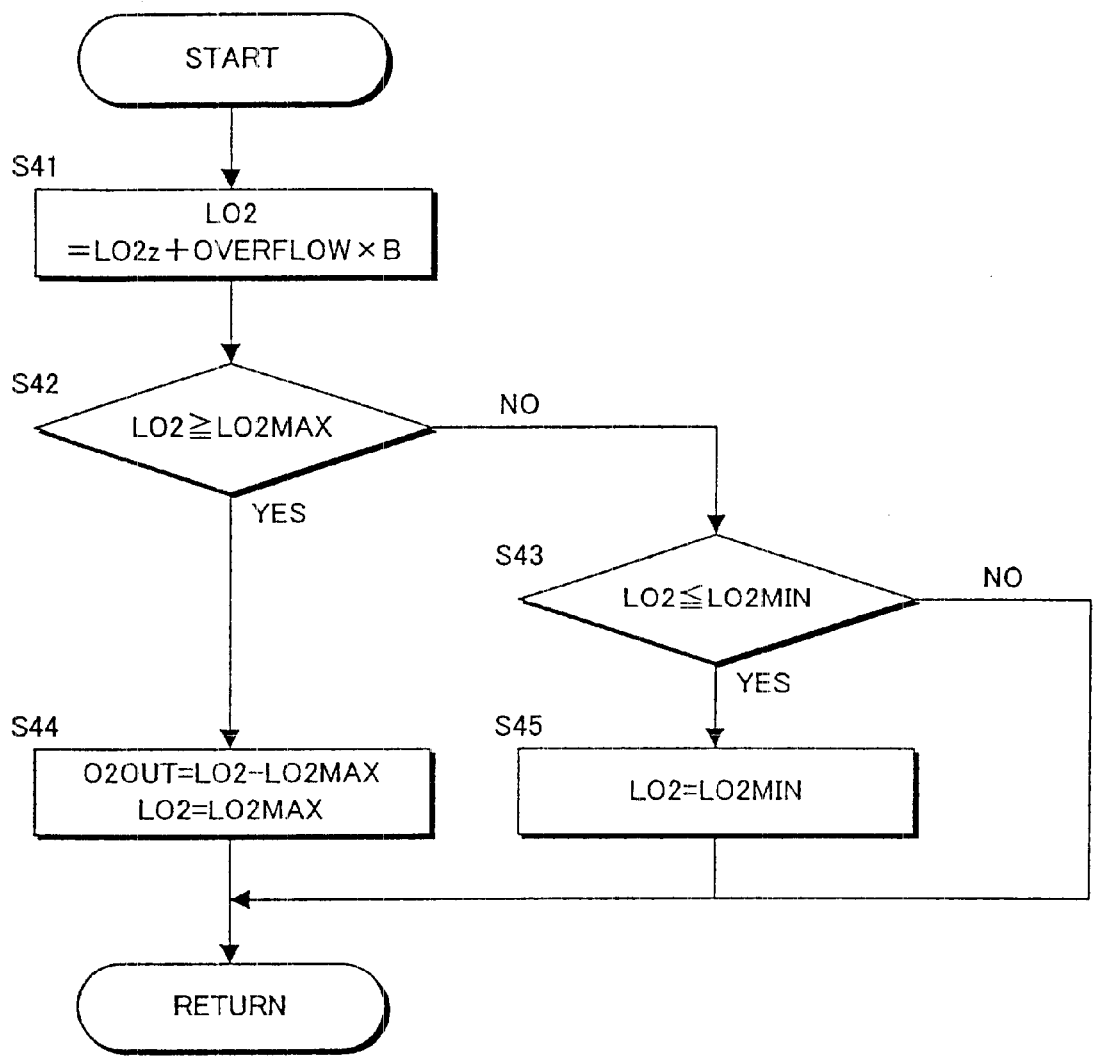
FIG. 7 is a flowchart showing a subroutine for computing a low speed component of the oxygen storage amount.

FIG. 7 shows a subroutine for computing the low speed component LO2 of the oxygen storage amount. In this subroutine, the low speed component LO2 is computed based on the overflow oxygen amount OVERFLOW which has overflowed from the high speed component HO2.

According to this, in a step S41, the low speed component LO2 is computed by the following equation (5):

$$LO2=LO2z+OVERFLOW \times B \qquad (5)$$

where: LO2z=immediately preceding value of low speed component LO2, and

B=oxygen storage/release rate of low speed component.

Here, the oxygen storage/release rate B of the low speed component is set to a positive value less than 1, but actually has different characteristics for storage and release. Further, the real storage/release rate is affected by the catalyst temperature TCAT and the low speed component LO2, so the storage rate and release rate can be set to vary independently. In this case, when the overflow oxygen amount OVERFLOW is positive, oxygen is in excess, and the oxygen storage rate at this time is set to for example a value which is larger the higher the catalyst temperature TCAT or the smaller the low speed component LO2. Also, when the overflow oxygen amount OVERFLOW is negative, oxygen is deficient, and the oxygen release rate at this time may for example be set to a value which is larger the higher the catalyst temperature TCAT or the larger the low speed component LO2.

In steps S42, S43, in the same way as when the high speed component HO2 is computed, it is determined whether or not the computed low speed component LO2 has exceeded a maximum capacity LO2MAX or is less than a minimum capacity LO2MIN (0).

When maximum capacity LO2MAX is exceeded, the routine proceeds to a step S44, an oxygen excess/deficiency amount O2OUT which has overflowed from the low speed component LO2 is computed from the following equation (6):

$$LO2OUT=LO2-LO2MAX \qquad (6)$$

and the low speed component LO2 is limited to the maximum capacity LO2MAX. The oxygen excess/deficiency amount O2OUT flows out downstream of the catalyst 3a.

When the low speed component LO2 is less than the minimum capacity, the routine proceeds to a step S45, and the low speed component LO2 is limited to the minimum capacity LO2MIN.

Next, the resetting of the computed value of the oxygen storage amount performed by the controller 6 will be described. By resetting the computed value of the oxygen storage amount under predetermined conditions, computational errors which have accumulated so far are eliminated, and the computational precision of the oxygen storage amount can be improved.

Figure 8:
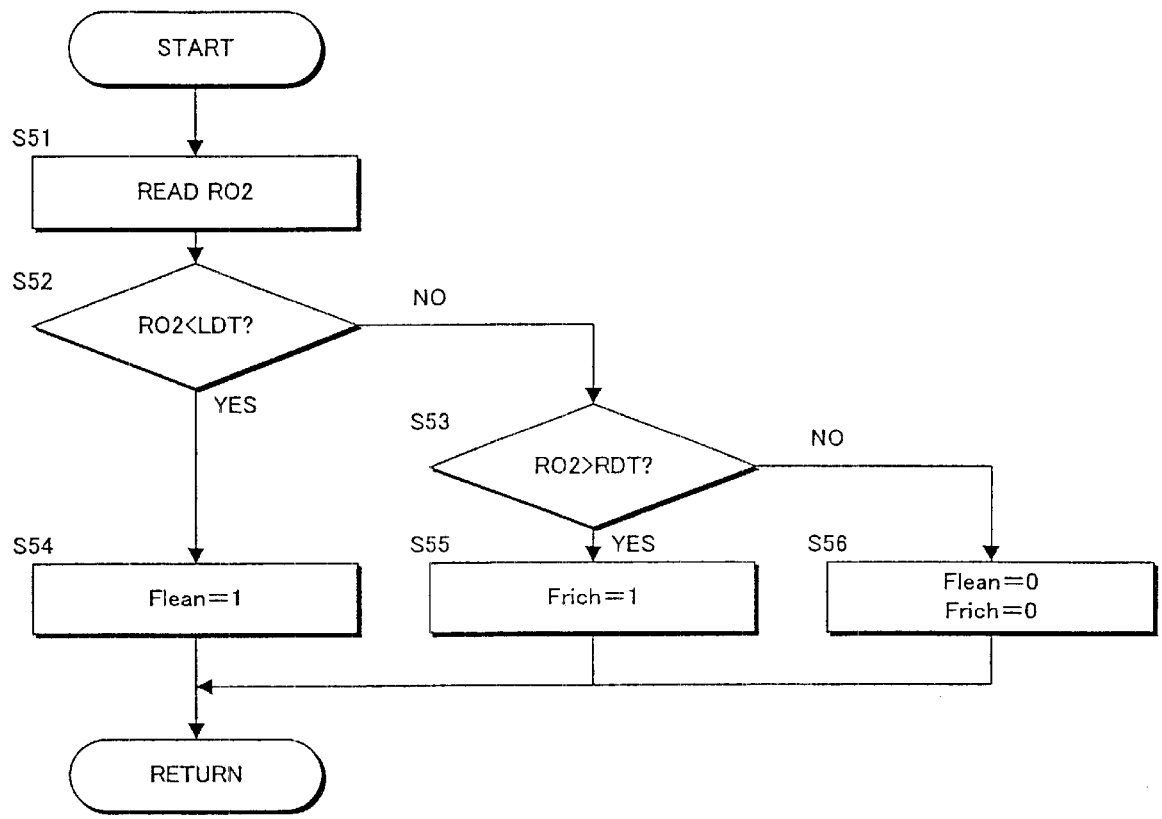
FIG. 8 is a flowchart showing a routine for determining a reset condition.

FIG. 8 shows the details of a routine for determining the reset condition. This routine determines whether or not a condition for resetting the oxygen storage amount (high speed component HO2 and low speed component LO2) holds from the exhaust air-fuel ratio downstream of the catalyst 3a, and sets a flag Frich and a flag Flean.

First, in a step S51, the output of the rear oxygen sensor 5 which detects the exhaust air-fuel ratio downstream of the catalyst 3a is read. Subsequently, in a step S52, the rear oxygen sensor output RO2 is compared with a lean determining threshold LDT, and in a step S53, the rear oxygen sensor output RO2 is compared with the rich determining threshold RDT.

As a result of these comparisons, when the rear oxygen sensor output RO2 is less than the lean determining threshold LDT, the routine proceeds to a step S54, and the flag Flean is set to "1" showing that the lean reset condition for the oxygen storage amount holds. When the rear oxygen sensor output RO2 exceeds the rich determining threshold RDT, the routine proceeds to a step S55, and the flag Frich is set to "1" showing that the rich reset condition for the oxygen storage amount holds.

When the rear oxygen sensor output RO2 lies between the lean determining threshold LDT and rich determining threshold RDT, the routine proceeds to a step S56, and the flags Flean and Frich are set to "0" showing that the lean reset condition and rich reset condition do not hold.

Figure 9:
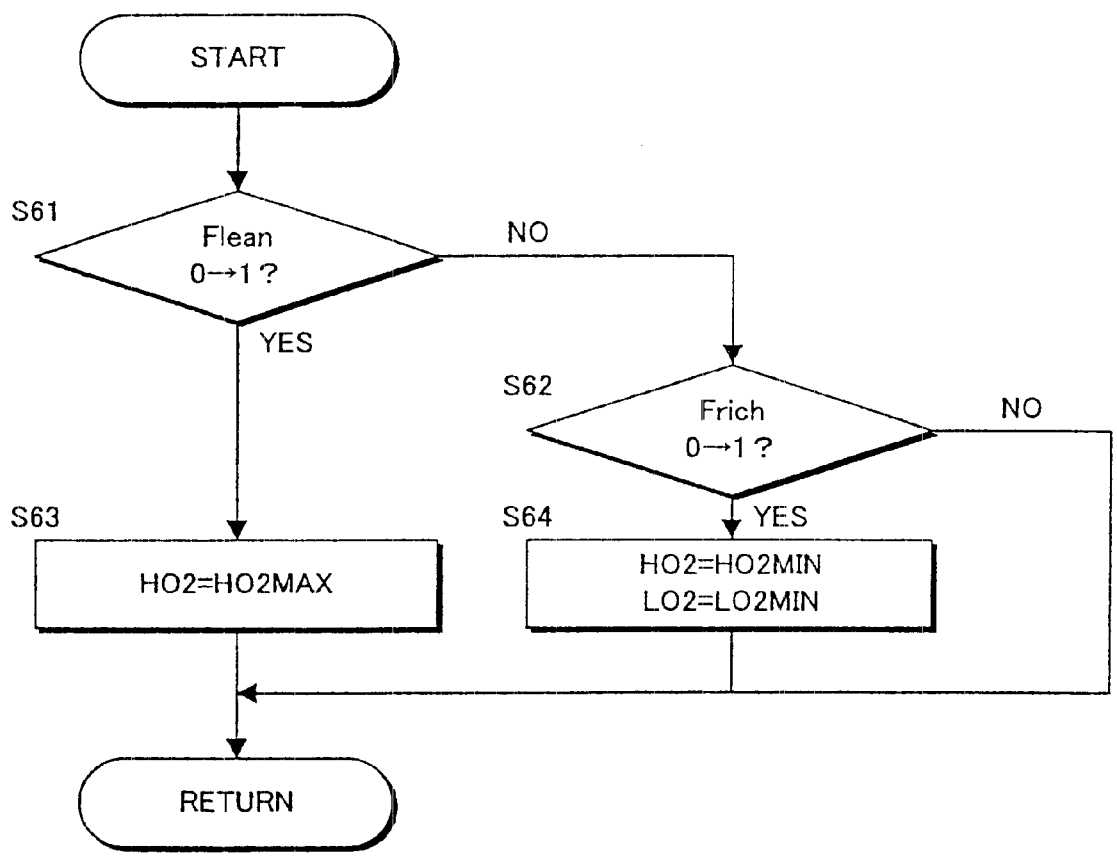
FIG. 9 is a flowchart showing a routine for performing reset of the computed oxygen storage amount.

FIG. 9 shows a routine for resetting the oxygen storage amount.

According to this, in steps S61, S62, it is determined whether or not the lean reset conditions or rich reset conditions hold based on the variation of the values of the flags Flean and Frich.

When the flag Flean changes from "0" to "1", and it is determined that lean reset conditions hold, the routine proceeds to a step S63, and the high speed component HO2 of the oxygen storage amount is reset to the maximum capacity HO2MAX. At this time, resetting of the low speed component LO2 is not performed. On the other hand, when the flag Frich changes from "0" to "1", and it is determined that rich reset conditions hold, the routine proceeds to a step S64, and the high speed component HO2 and low speed component LO2 of the oxygen storage amount are respectively reset to the minimum capacities HO2MIN, LO2MIN.

The reason why resetting is performed under these conditions is that as the oxygen storage rate of the low speed component LO2 is slow, oxygen overflows downstream of the catalyst even if the low speed component LO2 has not reached maximum capacity when the high speed component HO2 reaches maximum capacity, and when the exhaust air-fuel ratio downstream of the catalyst becomes lean, it may be considered that at least the high speed component HO2 has reached maximum capacity.

When the exhaust air fuel ratio downstream of the catalyst becomes rich, oxygen is not released from the low speed component LO2 which is released slowly. Therefore, it may be considered that the high speed component HO2 and low speed component LO2 are both not being stored and are at minimum capacity.

Next, the air-fuel ratio control performed by the controller 6 (oxygen storage amount constant control) will be described.

Figure 10:
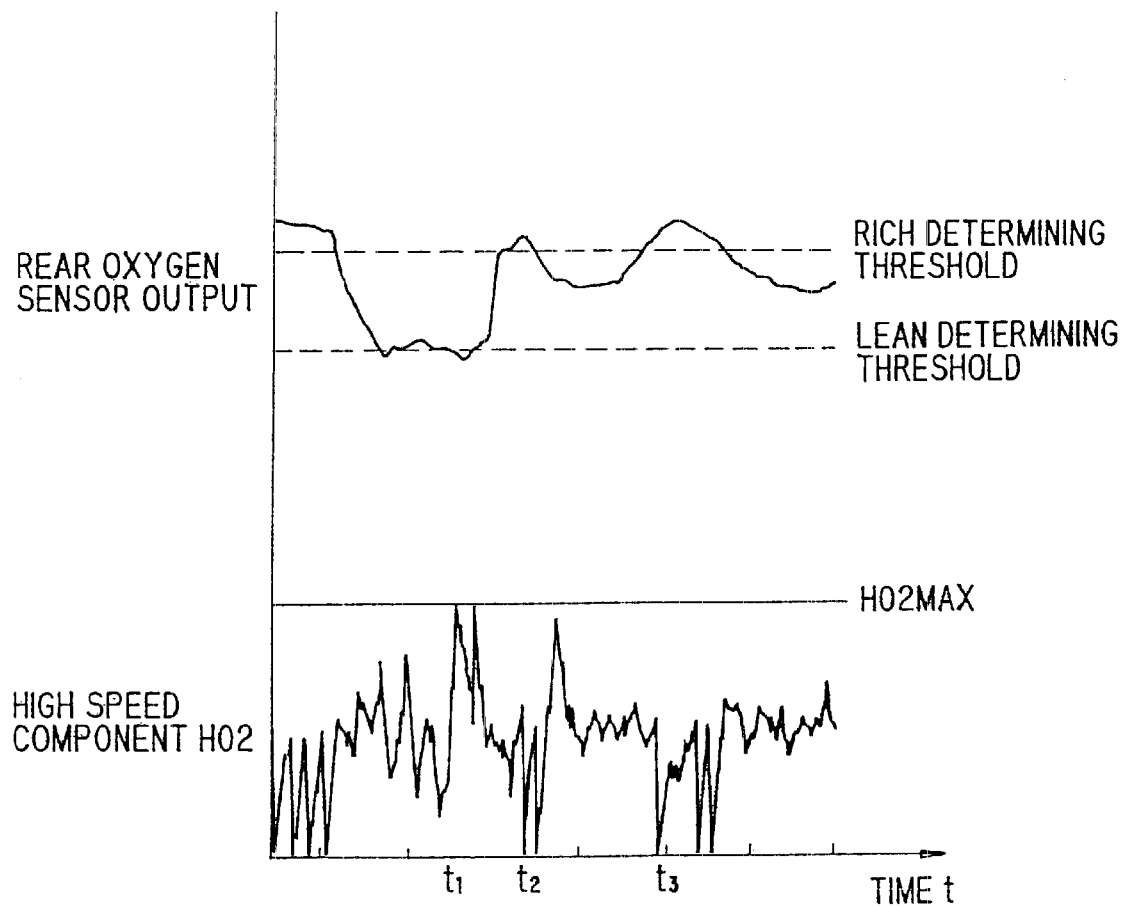
FIG. 10 is a flowchart showing a routine for computing a target air fuel ratio based on the oxygen storage amount.

FIG. 10 shows a routine for computing a target air fuel ratio based on the oxygen storage amount.

Figure 11:
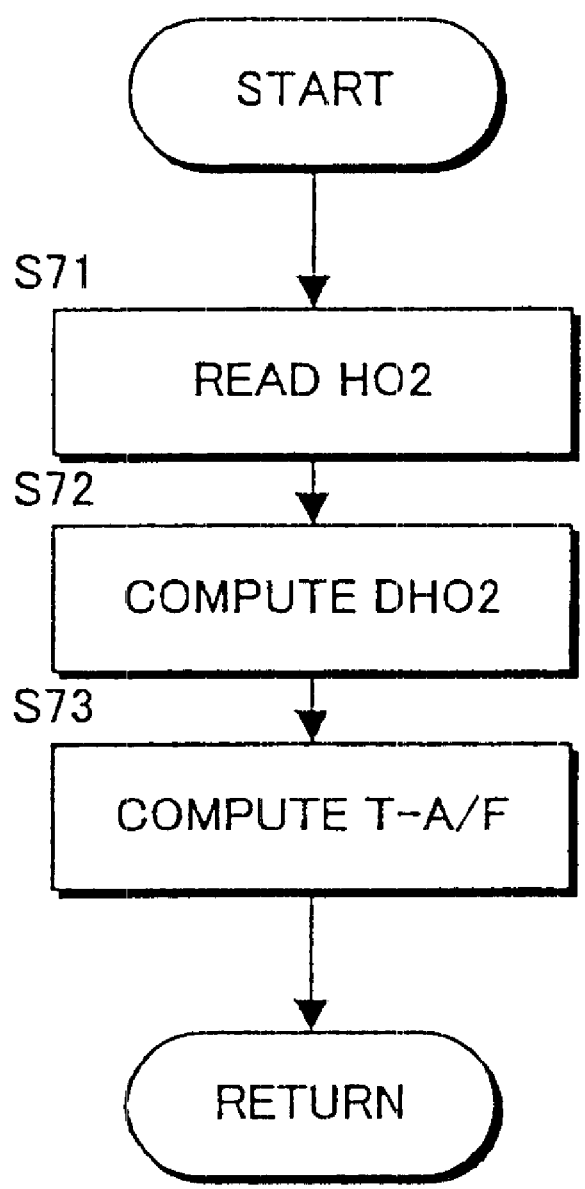
FIG. 11 is a diagram showing how a rear oxygen sensor output and high speed component vary when the oxygen storage amount is controlled to be constant.

FIG. 11 shows a routine for computing a target air fuel ratio based on the oxygen storage amount.

According to this, in a step S71, the high speed component HO2 of the present oxygen storage amount is read. In a step S72, a deviation DHO2 (=oxygen excess/deficiency amount required by catalyst 3a) between the current high speed component HO2 and a target value TGHO2 of the high speed component, is computed. The target value TGHO2 of the high speed component is set to, for example, half of the maximum capacity HO2MAX of the high speed component.

In a step S73, the computed deviation DHO2 is converted to an air-fuel ratio equivalent value, and a target air-fuel ratio T-A/F of the engine 1 is set.

Therefore, according to this routine, when the high speed component HO2 of the oxygen storage amount does not reach a target amount, the target air fuel ratio of the engine 1 is set to lean, and the oxygen storage amount (high speed component HO2) is increased. On the other hand, when the high speed component HO2 exceeds the target amount, the target air fuel ratio of the engine 1 is set to rich, and the oxygen storage amount (high speed component HO2) is decreased.

Next, the overall action performed by the above control will be described.

In the exhaust purification device according to this invention, when the engine 1 starts, the oxygen storage amount of the catalyst 3a is estimated by the controller 6 based on the air-fuel ratio of the exhaust gas flowing into the catalyst 3a and the intake air amount, and computation of the oxygen storage amount is divided into the high speed component HO2 and low speed component LO2 according to the actual characteristics.

Specifically, the computation is performed assuming that when oxygen is stored, the high speed component HO2 is preferentially stored, and the low speed component LO2 begins to be stored when the high speed component HO2 can no longer be stored. The computation also assumes that when oxygen is released, when the ratio (LO2/HO2) of the low speed component LO2 and high speed component HO2 is less than the predetermined value AR, oxygen is preferentially released from the high speed component HO2, and when the ratio LO2/HO2 reaches the predetermined value AR, oxygen is released from both the low speed component LO2 and high speed component HO2 to maintain this ratio LO2/HO2.

When the high speed component HO2 of the computed oxygen storage amount is larger than the target value, the controller 6 decreases the high speed component by controlling the air-fuel ratio of the engine 1 to rich, and when it is less than the target value, the high speed component HO2 is increased by controlling the air-fuel ratio to lean.

As a result, the high speed component HO2 of the oxygen storage amount is maintained at the target value, and even if the air-fuel ratio of the exhaust flowing into the catalyst 3a shifts from the stoichiometric air-fuel ratio, oxygen is immediately stored as the high speed component HO2 or immediately released as the high speed component HO2 which has a high responsiveness, the catalyst atmosphere is corrected to the stoichiometric air-fuel ratio, and the conversion efficiency of the catalyst 3a is maintained at a maximum.

Further, if computational errors accumulate, the computed oxygen storage amount shifts from the real oxygen storage amount, however the oxygen storage amount (high speed component HO2 and low speed component LO2) is reset with a timing at which the exhaust downstream of the catalyst 3a becomes rich or lean, and any discrepancy between the computed value and real oxygen storage amount is corrected.

FIG. 10 shows how the high speed component HO2 varies when the above oxygen storage amount constant control is performed.

FIG. 11 shows how the high speed component HO2 varies when the above oxygen storage amount constant control is performed.

In this case, at the time t1, the output of the first rear oxygen sensor 5a becomes less than the lean determining threshold and lean reset conditions hold, so the high speed component HO2 is reset to the maximum capacity HO2MAX. However, the low speed component LO2 is not necessarily a maximum at this time, so reset of the low speed component is not performed, not shown.

At times t2, t3, the output of the first rear oxygen sensor 5a becomes greater than the rich determining threshold and rich reset conditions hold, so the high speed component HO2 of the oxygen storage amount is reset to the minimum capacity (=0). The low speed component LO2 at this time is also reset to the minimum capacity, not shown.

Thus, resetting of the computed values of the oxygen storage amount is performed with a timing at which the air-fuel ratio of the exhaust downstream of the catalyst 3a becomes rich or lean, and as a result of the discrepancy from the real oxygen storage amount being corrected, the computational precision of the oxygen storage amount of the catalyst is further enhanced, the precision of air-fuel ratio control for maintaining the oxygen storage amount constant is increased, and the conversion efficiency of the catalyst is maintained at a high level.

The above is an example of the air-fuel ratio control assumed by this invention. According to this invention, the oxygen storage amount of a second catalyst 3b after running at a lean air-fuel ratio is controlled to an appropriate amount by a second rear O2 sensor 5b. In the following description, this point will be described referring to FIG. 12 and subsequent drawings.

Figure 12:
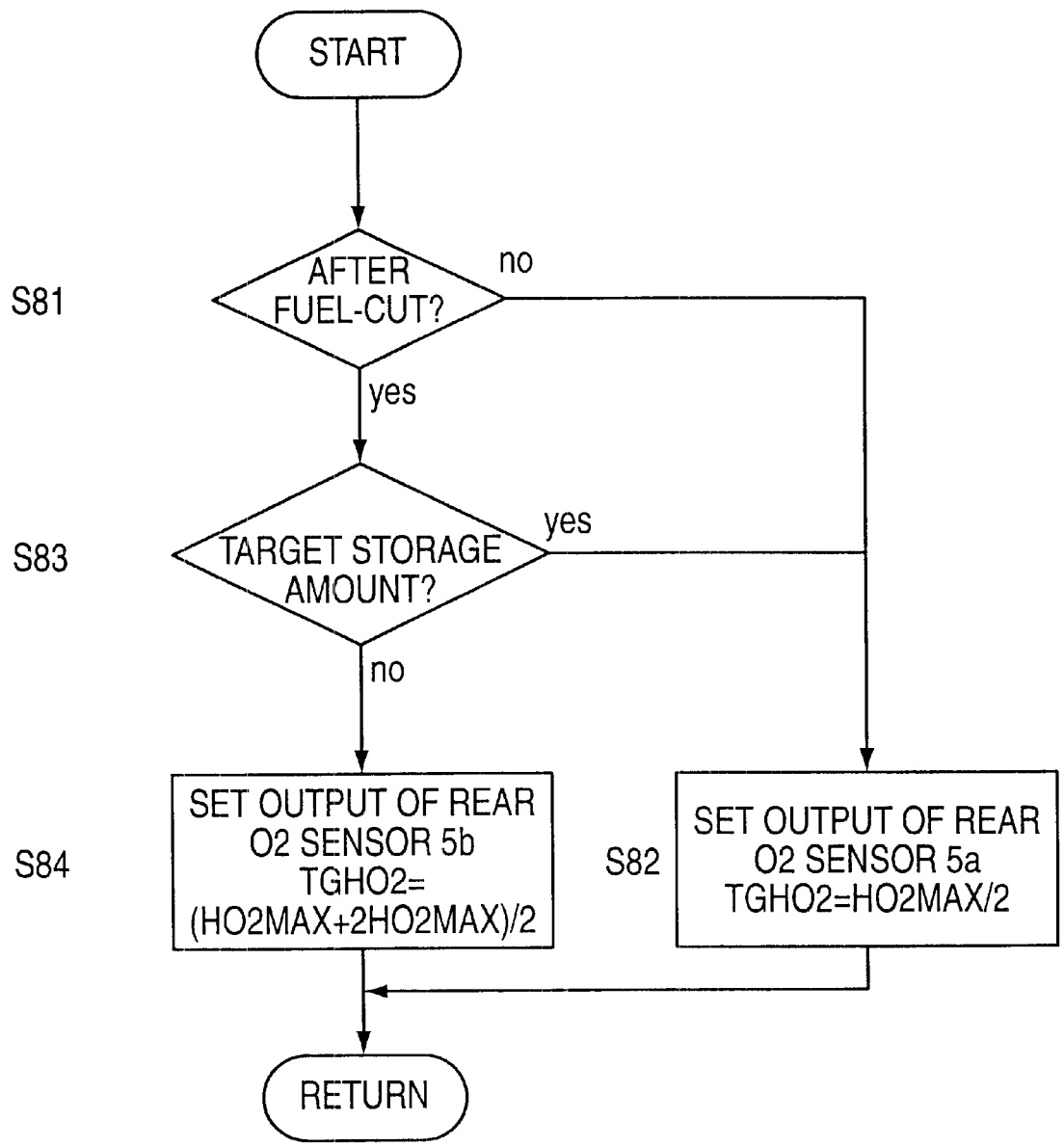
FIG. 12 is a flowchart showing the details of a first embodiment of the processing routine related to an air-fuel ratio control after a lean running.
Figure 13:
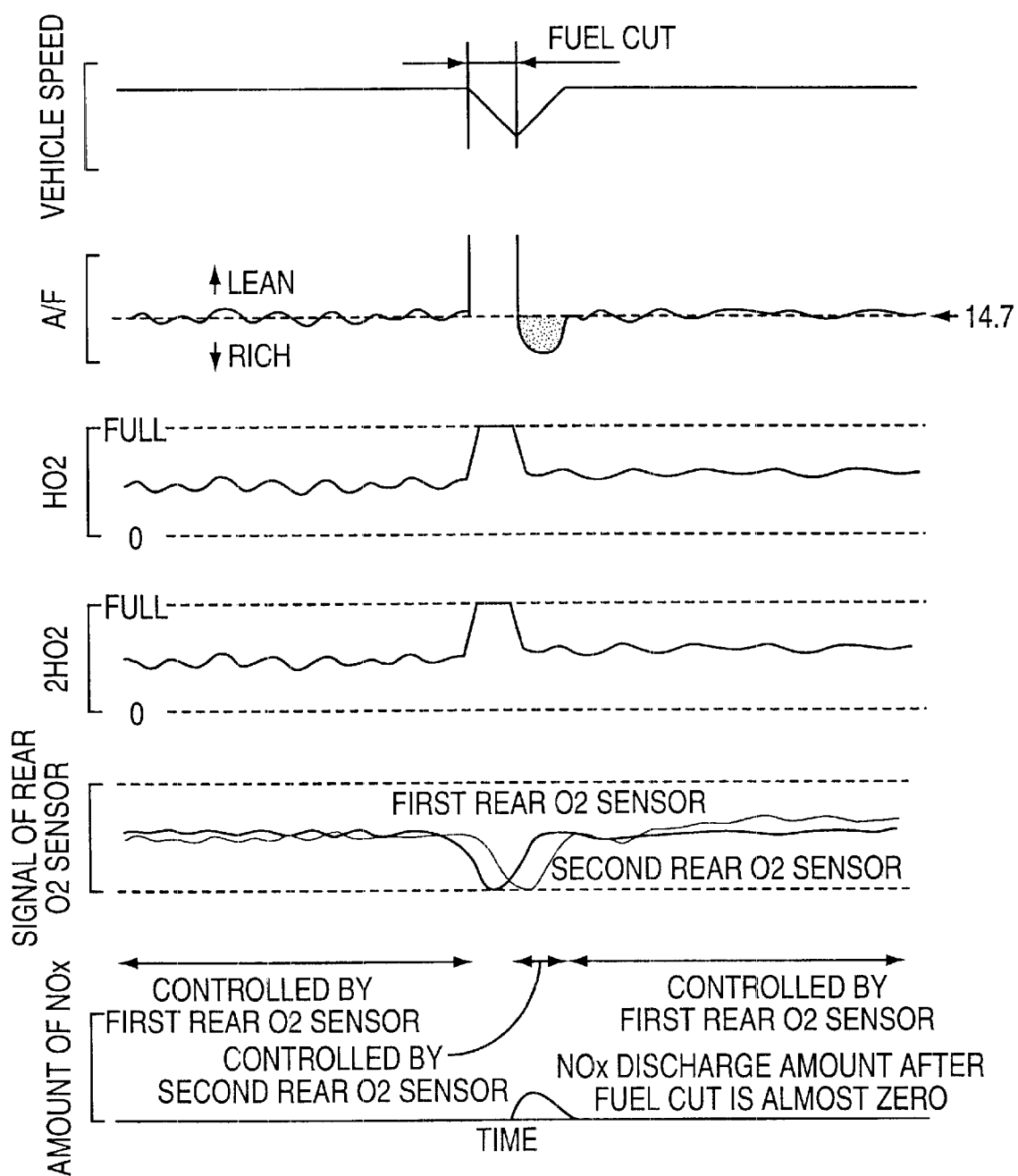
FIG. 13 is a diagram showing how the air-fuel ratio, a rear oxygen sensor output etc. varies when a control is performed according to the first embodiment.

FIG. 12 is a flowchart showing the control of the first embodiment which controls the oxygen storage amount of the second catalyst 3b, and FIG. 13 is a diagram showing how the air-fuel ratio etc. vary due to this control. This processing is performed periodically in synchronism with the above air-fuel ratio control. It has functions to select the first rear O2 sensor 5a output used by the reset condition determining routine of FIG. 8, and to set a target oxygen storage amount (TGHO2) used by the air-fuel ratio control routine of FIG. 10.

In this processing, it is first determined whether or not the fuel cut control is performed during deceleration in a step S81. Whether or not the fuel cut control has practiced, is determined by monitoring the fuel control signal as described above in FIG. 13, or by detecting the fuel cut conditions independently. As an example of control conditions for the fuel cut control during deceleration, start conditions are that the vehicle speed and engine rotation speed are bigger than or equal to a determining value, the accelerator pedal is released, and the transmission is not in neutral. A fuel cut started in this way is terminated and a recovery is performed when the engine rotation speed falls lower than a lower limiting determining value or the accelerator pedal is depressed. Therefore, the fuel cut during deceleration and recovery are determined by monitoring these conditions.

In this step, it is determined whether or not a post-fuel cut recovery has started, and a flag FFCR is set to 1 when the recovery start is detected in a step S81 and a step S84). The flag FFCR shows that a transient post-recovery rich air-fuel ratio control is being performed, and it is reset to 0 when this control is terminated. When the flag FFCR is 0, the output of the first rear O2 sensor 5a is adopted as the rear O2 sensor output used for reset determination (FIG. 8), and ½ of the maximum oxygen storage amount HO2MAX of the first catalyst 3a is set as a target oxygen storage amount TGHO2 in a step S82 and a step S83). Hence, due to the above air-fuel ratio control, the oxygen storage amount of the first catalyst 3a is maintained at about ½ of its maximum value, and stable exhaust purification performance is achieved. During this period, as the air-fuel ratio of the exhaust from upstream is stable in the vicinity of the stoichiometric air-fuel ratio, a large excess/insufficiency of the oxygen storage amount of the downstream catalysts 3b, 3c does not occur.

On the other hand, during the aforesaid post-recovery air-fuel ratio control (FFCR=1), it is first determined whether or not the oxygen storage amount is the target amount, and when it has recovered to the target amount, the flag FFCR is reset to 0 and the routine returns to normal processing in a step S82 and a step S83. When the oxygen storage amount is not the target amount, the output of the second rear O2 sensor 5b is adopted as the rear O2 sensor output used for reset determination, and ½ of the sum of the maximum oxygen storage amount HO2MAX of the first catalyst 3a and the maximum oxygen storage amount 2HO2MAX of the second catalyst 3b is set as the target oxygen storage amount TGHO2 in a step S84. Due to this, the air-fuel ratio control is performed so that the oxygen storage amounts of the catalysts 3a, 3b are respectively approximately ½, so the catalysts 3a, 3b for which the oxygen storage amounts were excessive in a lean atmosphere due to fuel cut rapidly return to the appropriate amounts, and the desired exhaust purification performance is recovered.

In this embodiment, the exhaust purification device comprises the second rear O2 sensor 5b provided in the exit of the second catalyst 3b and controls the air-fuel ratio based on the characteristic of exhaust detected by the second rear O2 sensor 5b so that the oxygen storage amounts of the catalysts 3a,3b are target values after running at a lean air-fuel ratio due to fuel cut. Therefore the exhaust purification device can maintain the oxygen storage amounts of the catalysts 3a,3b within the determined amount and maintain the stable exhaust purification performance. The air-fuel ratio control at this time controls the air-fuel ratio which is rich from a determining value until the exhaust characteristic of the second catalyst 3b varies toward rich from the determining value when the exhaust characteristic of the second catalyst 3b has become leaner than the determining value.

The running state at the lean air-fuel ratio is detected typically from a fuel cut control like at the deceleration. This start and finish can detect from the signal of the controller 6. This control after the running at the lean air fuel ratio can start according to the finish of the fuel cut. The fuel cut control is not necessarily at the deceleration, for example when a high load running or a high speed running is continued, this fuel cut control is performed to protect the engine to all cylinders or a part of cylinders. In this case, the exhaust gas which flows into the catalyst is lean condition which is due to the excessive O2. The lean running condition may be detected directly by the output of the second rear O2 sensor 5b.

The characteristic of exhaust which should be detected can select from which is possible to determine the amount of the oxygen storage amount, for example the air-fuel ratio or the oxygen concentration.

Due to compute the oxygen storage amount of the catalyst separately for a high-speed component which has a high store/release rate, and a low speed component which has a slower storage/release rate than the high-speed component, actual oxygen storage amount of the catalyst according to the catalyst characteristic is computed more accurately. Therefore the actual oxygen storage amount of the catalyst is controlled more accurately.

Figure 14:
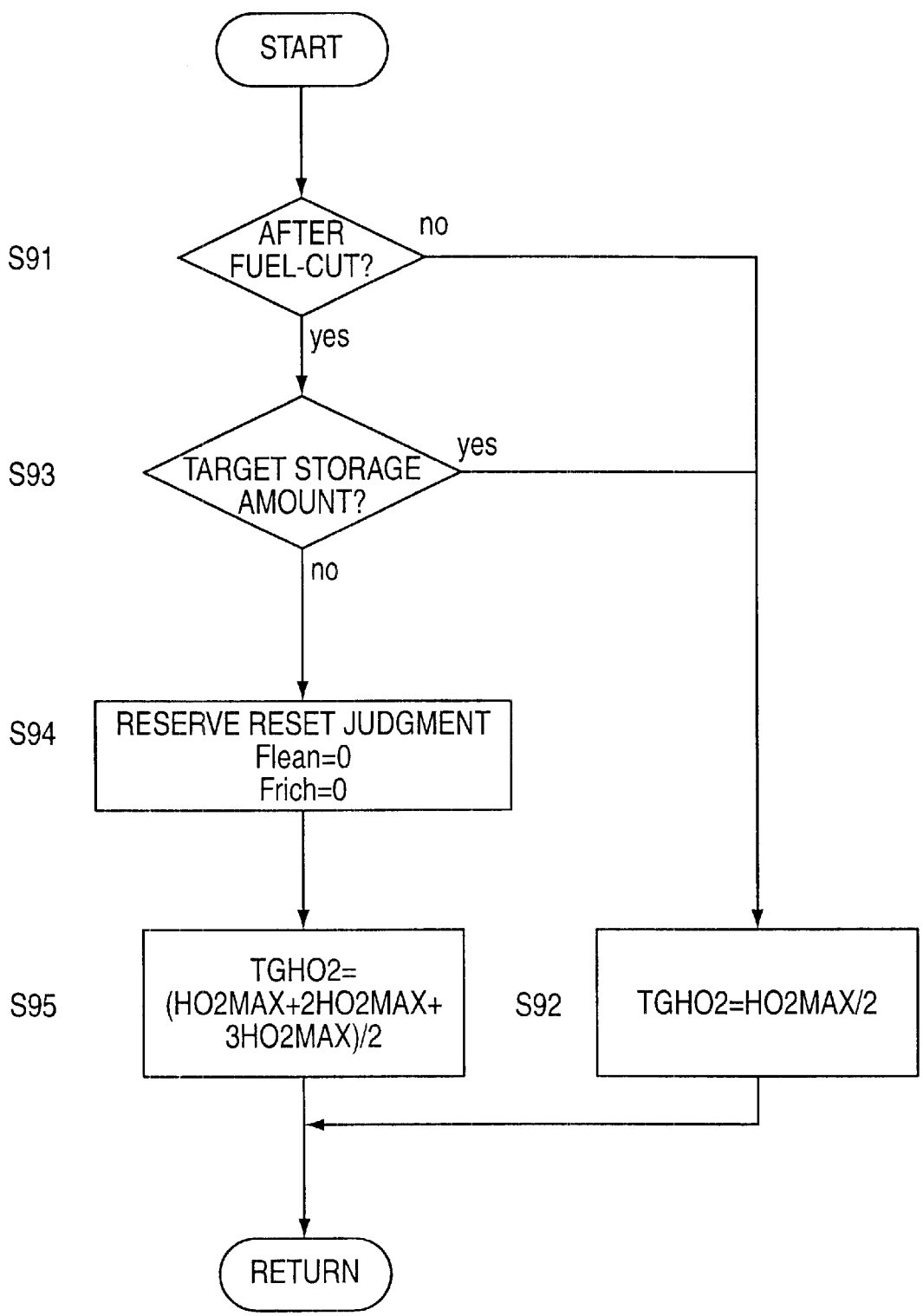
FIG. 14 is similar to FIG. 12, but showing the details of a second embodiment of the processing routine related to the air-fuel ratio control after the lean running.
Figure 15:
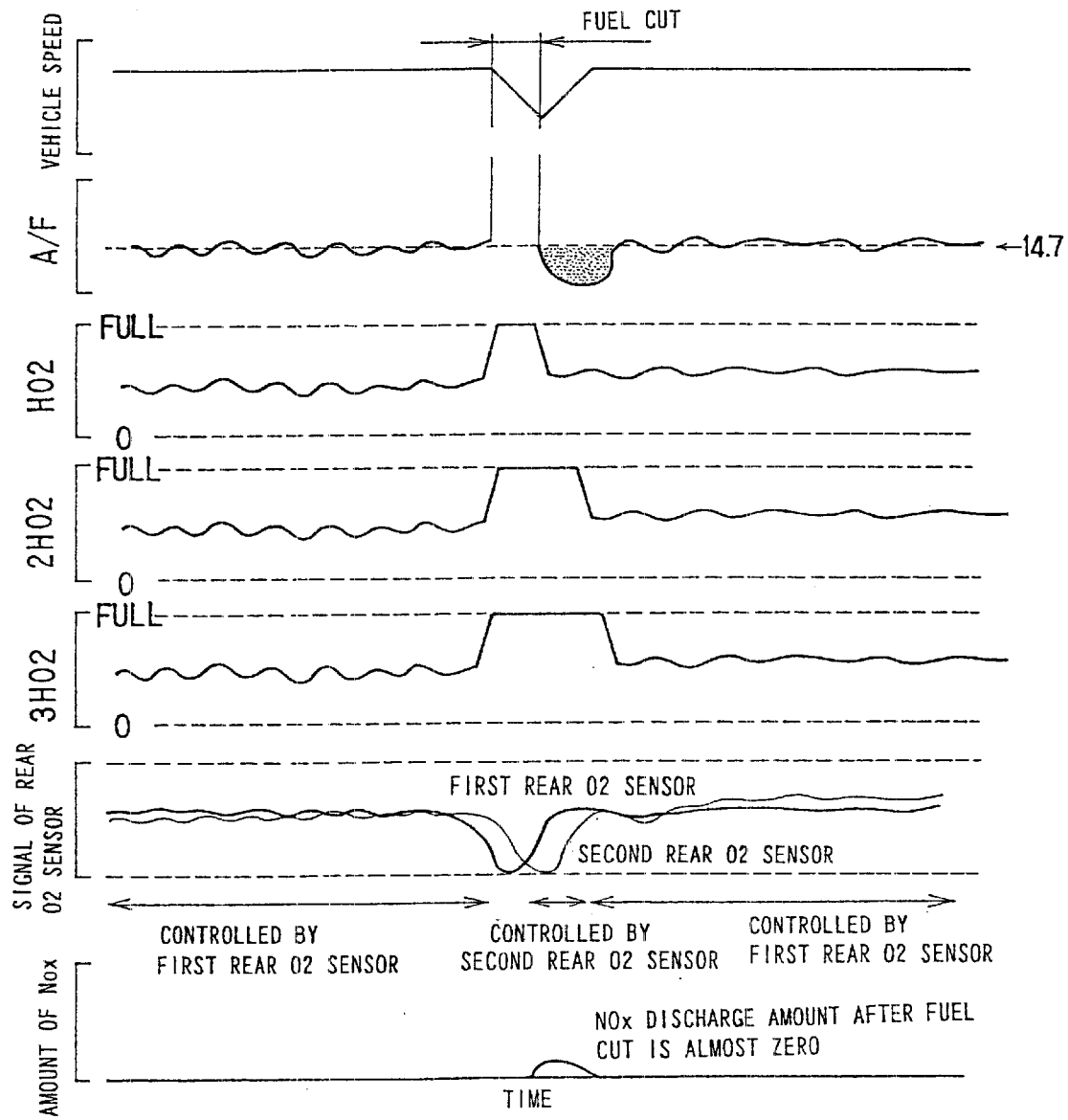
FIG. 15 is similar to FIG. 13, but showing how the air-fuel ratio, the rear oxygen sensor output etc. varies when a control is performed according to the second embodiment.

FIG. 14 is a flowchart showing the control according to the second embodiment for controlling the oxygen storage amount. FIG. 15 is a diagram showing how the air-fuel ratio etc. varies under this control. In FIG. 14, the processing of the flag (FFCR) showing start and finish of the transient rich air-fuel ratio control after the fuel cut recovery is omitted.

In the processing of FIG. 12, the oxygen storage amounts of the first and second catalysts 3a, 3b after lean conditions rapidly return to the appropriate amounts, but if a third catalyst 3c is further provided shown in FIG. 1, the oxygen storage amount of the third catalyst 3c is not necessarily controlled to the appropriate amount. To control this, a rear O2 sensor may be provided downstream of the third catalyst 3c, but the construction is more complex. Hence, in this processing, the target oxygen storage amount is set assuming that the oxygen storage amount of the second catalyst 3b represents also the oxygen storage amount of the third catalyst as described later.

In this processing, determination after fuel cut in a step S91, setting of the target air-fuel ratio TGHO2 in cases other than fuel cut in a step S92 and termination of the processing due to attainment of the target oxygen storage amount in a step S93 are respectively identical to FIG. 12. However, in the processing until the target oxygen storage amount after fuel cut is reached, the reset determining flags Flean, Frich are first respectively held at 0, the preset processing of FIG. 9 is interrupted in a step S94, and the target oxygen storage amount TGHO2 is then set to reduce the oxygen storage amounts of the catalysts 3a, 3b, 3c. Here, ½ of the sum of the respective maximum oxygen storage amounts HO2MAX, 2HO2MAX, 3HO2MAX of the first catalyst 3a, the second catalyst 3b and the third catalyst 3c is set as the target oxygen storage amount TGHO2 in a step S95. Due to this, the air-fuel ratio control is performed so that approximately ½ of the oxygen storage amounts of the catalysts 3a, 3b is respectively obtained, so the oxygen storage amounts of the catalysts 3a, 3b, 3c, which had an excess of oxygen storage amount in a lean atmosphere due to fuel cut, rapidly return to the appropriate amounts and the expected exhaust purification performance is restored.

In this embodiment, the third catalyst 3c is provided in down stream of the second catalyst 3b to improve the exhaust emission performance. In this structure, the air fuel ratio control is performed assuming that the oxygen storage amount of the third catalyst 3c is identical to the oxygen storage amount of the second catalyst 3b. Therefore this structure can maintain the high purification efficiency of the third catalyst 3c and exhibit the exhaust purification performance of the third catalyst 3c to the utmost limit.

Figure 16:
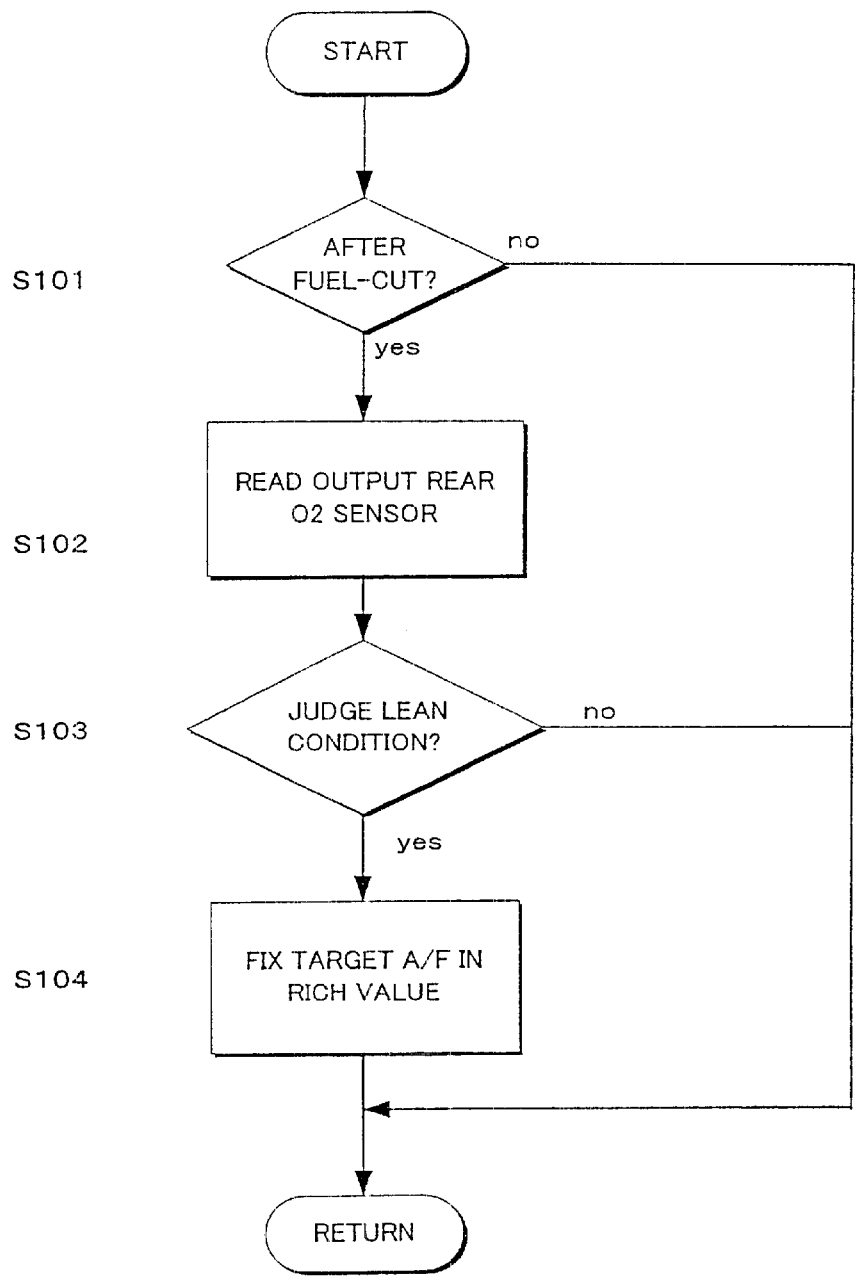
FIG. 16 is similar to FIG. 12, but showing the details of a third embodiment of the processing routine related to the air-fuel ratio control after the running.
Figure 17:
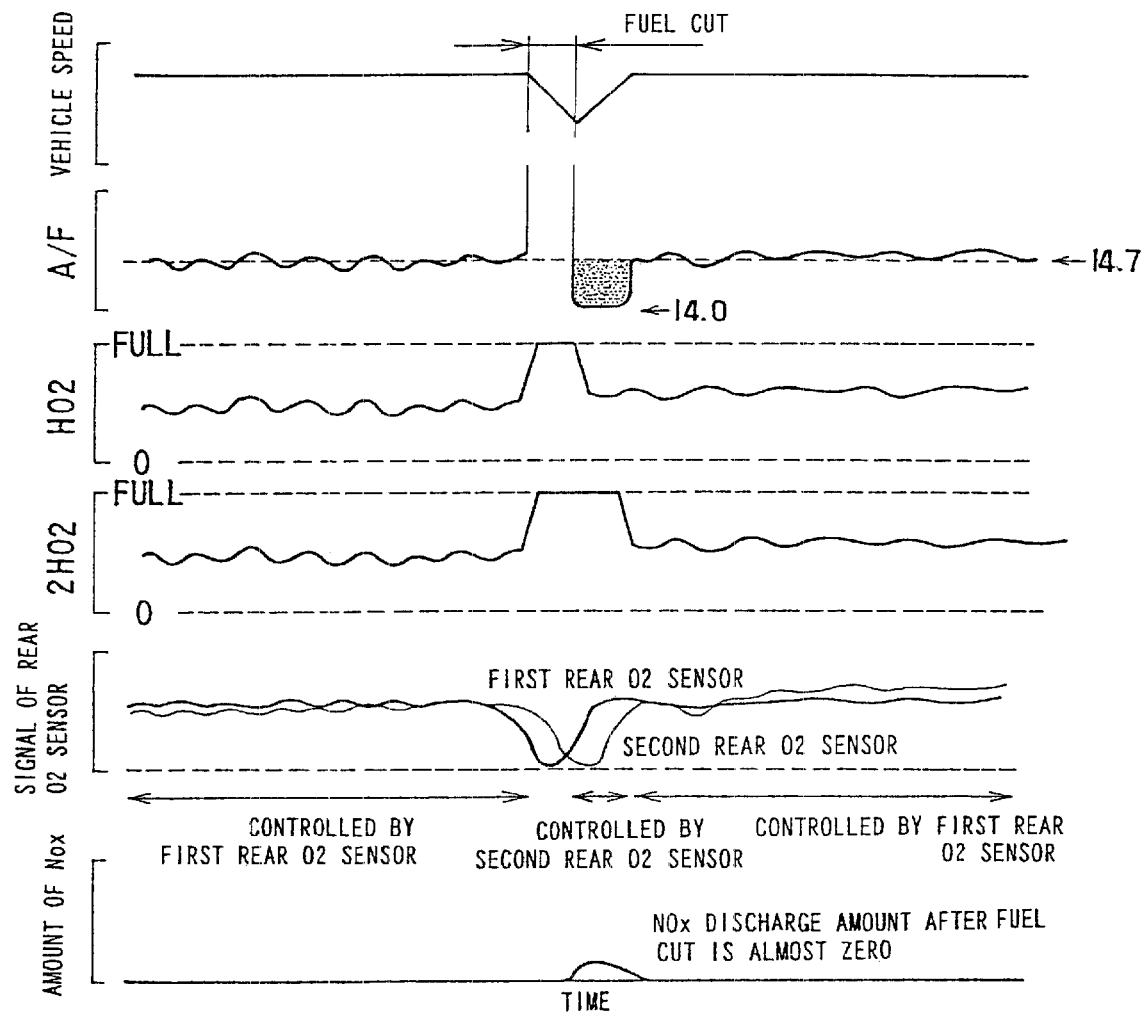
FIG. 17 is similar to FIG. 13, but showing how the air-fuel ratio, the rear oxygen sensor output etc. varies when a control is performed according to the third embodiment.

FIG. 16 is a flowchart showing the control according to a third embodiment for controlling the oxygen storage amount. FIG. 17 is a diagram showing how the air-fuel ratio etc. varies due to this control. In FIG. 16, the processing of the flag (FFCR) showing start and finish of the transient rich air-fuel ratio control after the fuel cut recovery is omitted.

In this control, when it is determined to be after fuel cut in a step S101, the output of the second rear O2 sensor 5b is compared with a predetermined lean determining value in steps S102, S103. When the sensor 5b output is leaner than the determining value, the target air-fuel ratio to be computed in the step S73 of FIG. 11 is clamped to a predetermined rich air-fuel ratio, e.g., A/F=approx. 14.0 in a step S104. When the output of the rear O2 sensor is richer than the determining value, this processing is canceled, and the target air-fuel ratio is set based on the target oxygen storage amount (FIG. 11).

Figure 18:
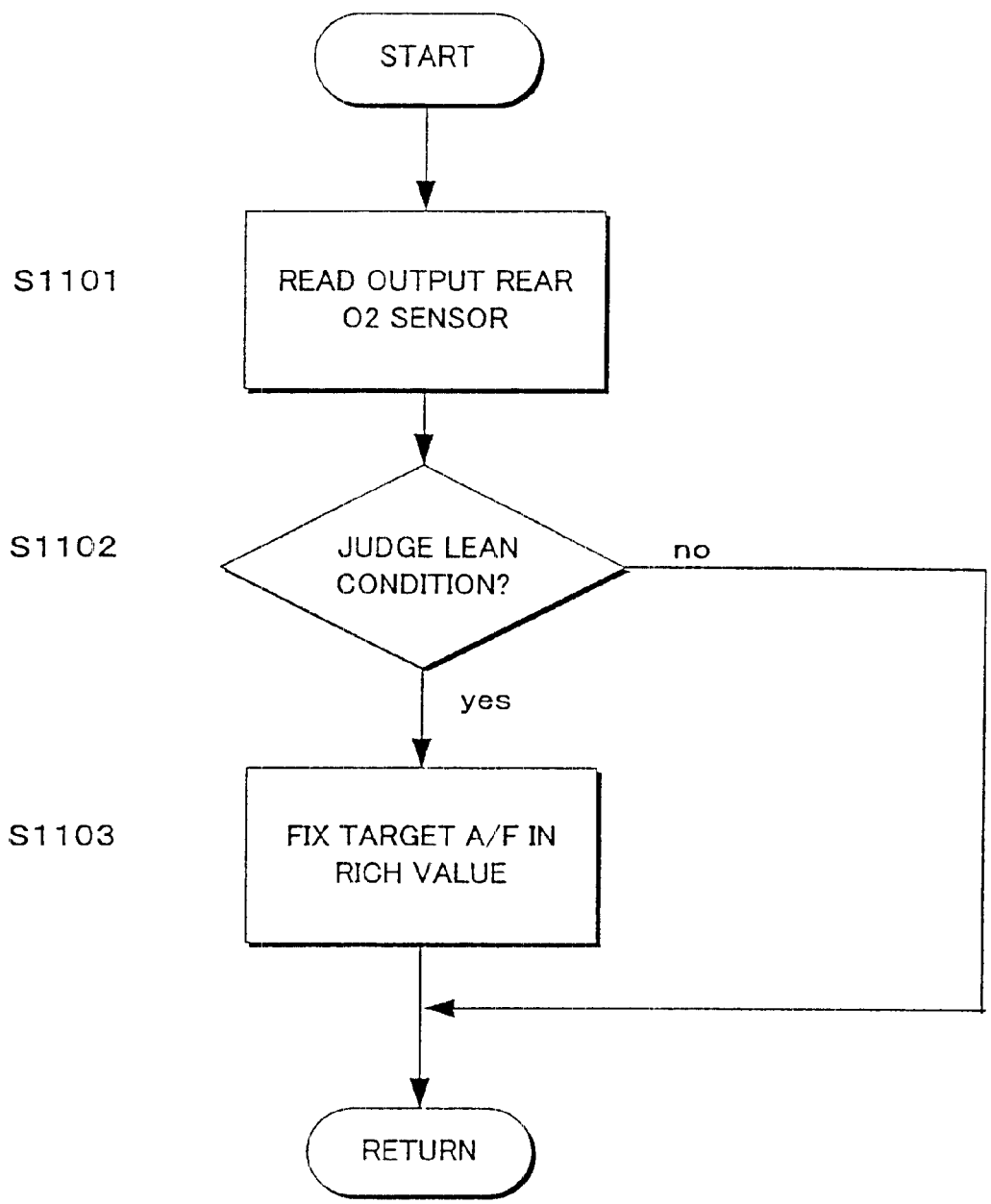
FIG. 18 is similar to FIG. 12, but showing the details of a fourth embodiment of the processing routine related to the air-fuel ratio control after the lean running.

FIG. 18 is a flowchart showing the control according to a fourth embodiment for controlling the oxygen storage amount. This is intended to clamp the target air-fuel ratio to rich side and decrease the oxygen storage amounts of the catalysts 3a, 3b to the target amounts when the second rear O2 sensor 5b output is lean, regardless of whether or not conditions the engine is running under the lean running condition such as fuel cut control (steps S1101, S1102, S1103). This control is identical to FIG. 16, excepting that the start condition which clamps the target air-fuel ratio to rich side is the result of comparing the output of the second rear O2 sensor 5b and the lean determining value.

The content of U.S. patent application Ser. No. 09/418,255, with a filing date Oct. 15, 1999 is hereby incorporated by reference.

The embodiments of this invention in which an exclusive property or privilege is claimed are defined.

INDUSTRIAL APPLICABILITY

As described above, the exhaust purification device according to the present invention is useful as an exhaust purification device which the conversion efficiency of a downstream catalyst is maintained at a high-level after lean running.

What is claimed is:

1. An exhaust purification device for an engine, comprising:
   a first catalyst provided in an exhaust pipe of the engine;
   a second catalyst provided downstream of the first catalyst;
   a front sensor which detects an exhaust characteristic flowing into the first catalyst;
   a rear sensor which detects an exhaust characteristic flowing out of the second catalyst; and
   a processor programmed to:
      compute an oxygen storage amount of the first catalyst using the exhaust characteristic detected by the front sensor;
      control an air-fuel ratio of the engine based on the computed oxygen storage amount so that the oxygen storage amount of the first catalyst is a target amount; and
      set a target air-fuel ratio to a predetermined fixed rich air-fuel ratio until the exhaust characteristic detected by the rear sensor becomes richer than a predetermined value, after running at a predetermined lean state.

2. The exhaust purification device as defined in claim 1, wherein the predetermined lean state is a fuel cut control state.

3. The exhaust purification device as defined in claim 1, wherein the processor is further programmed to compute the oxygen storage amount separately for a high-speed component which has a high storage/release rate and a low-speed component which has a slower storage/release rate than the high-speed component.

* * * * *